(12) United States Patent
Gonthier et al.

(10) Patent No.: US 8,004,231 B2
(45) Date of Patent: *Aug. 23, 2011

(54) CONTROL OF A TRIAC FOR THE STARTING OF A MOTOR

(75) Inventors: Laurent Gonthier, Tours (FR); Jean-Michel Simonnet, Veretz (FR)

(73) Assignee: STMicroelectronics S.A., Montrouge (FR)

( * ) Notice: Subject to any disclaimer, the term of this patent is extended or adjusted under 35 U.S.C. 154(b) by 0 days.

This patent is subject to a terminal disclaimer.

(21) Appl. No.: 12/391,947

(22) Filed: Feb. 24, 2009

(65) Prior Publication Data

US 2009/0174359 A1 Jul. 9, 2009

Related U.S. Application Data

(63) Continuation-in-part of application No. 11/602,889, filed on Nov. 21, 2006, now Pat. No. 7,514,897.

(30) Foreign Application Priority Data

Nov. 23, 2005 (FR) ...................................... 05 53570

(51) Int. Cl.
 *H02P 1/16* (2006.01)
(52) U.S. Cl. ........................................ 318/751; 318/778
(58) Field of Classification Search .................. 318/751, 318/753, 774, 778, 782, 783, 788
See application file for complete search history.

(56) References Cited

U.S. PATENT DOCUMENTS

| | | | |
|---|---|---|---|
| 3,978,388 A | 8/1976 | De Vries | |
| 4,323,834 A * | 4/1982 | Xuan et al. | 318/696 |
| 4,408,607 A | 10/1983 | Maurer | |
| 4,622,506 A * | 11/1986 | Shemanske et al. | 318/786 |
| 4,745,347 A * | 5/1988 | Wrege et al. | 318/744 |
| 5,391,971 A * | 2/1995 | Yamada et al. | 318/778 |
| 5,451,853 A * | 9/1995 | Itoh | 318/788 |
| 5,635,806 A | 6/1997 | Wissmach et al. | |
| 5,796,599 A | 8/1998 | Raonic et al. | |
| 6,137,275 A | 10/2000 | Ravon | |
| 6,320,348 B1 * | 11/2001 | Kadah | 318/785 |
| 6,844,698 B1 | 1/2005 | Kwon | |
| 7,514,897 B2 * | 4/2009 | Gonthier | 318/751 |
| 2005/0184699 A1 | 8/2005 | Unno | |

OTHER PUBLICATIONS

French Search Report dated Aug. 9, 2006 from corresponding French Application No. 05/53570, filed Nov. 23, 2005.
Patent Abstracts of Japan, vol. 005, No. 078 (E-058), May 22, 1981 & JP 56 025389, Mar. 11, 1981.
Patent Abstracts of Japan, vol. 008, No. 123 (E-249), Jun. 8, 1984 & JP 59 035575, Feb. 27, 1984.

* cited by examiner

*Primary Examiner* — Rina I Duda
(74) *Attorney, Agent, or Firm* — Wolf, Greenfield & Sacks, P.C.; James H. Morris

(57) ABSTRACT

A method and a circuit for controlling a triac intended to be series-connected with a resistive element of positive temperature coefficient or a capacitive element, and a winding for starting an asynchronous motor, for supply by an A.C. voltage, the present invention including the steps of: detecting a voltage representative of the voltage across the series connection of the element and of the triac; comparing this detected voltage with respect to a threshold; and blocking a turning back on of the triac when the threshold has been exceeded.

33 Claims, 4 Drawing Sheets

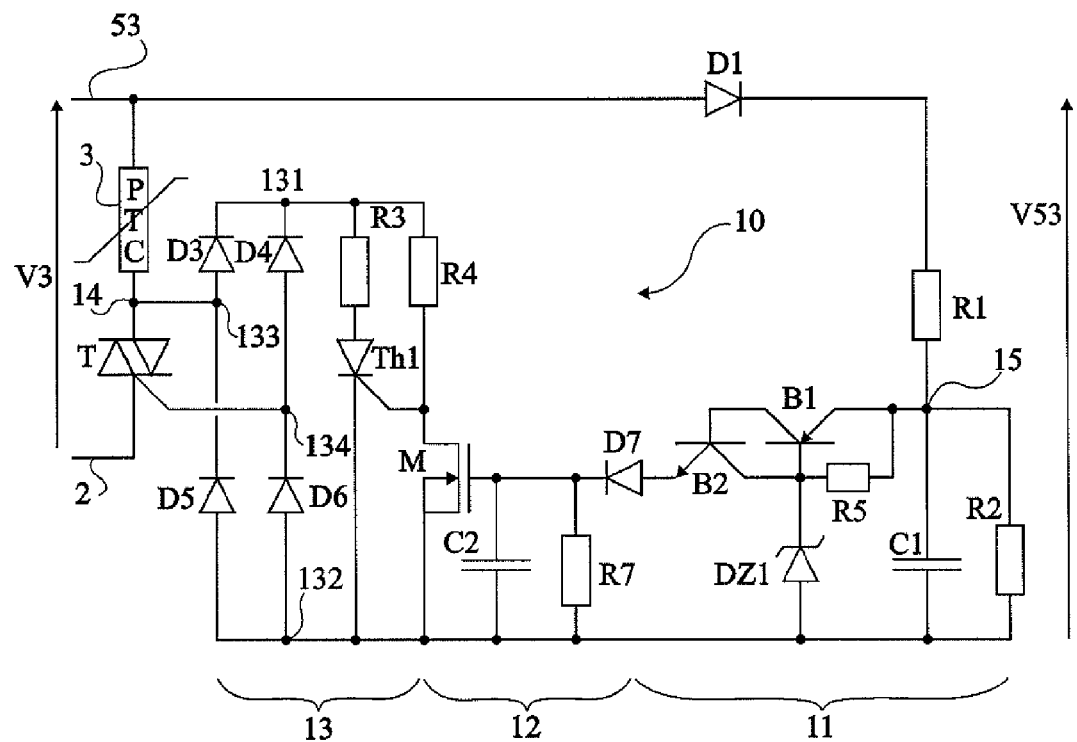
Fig 3
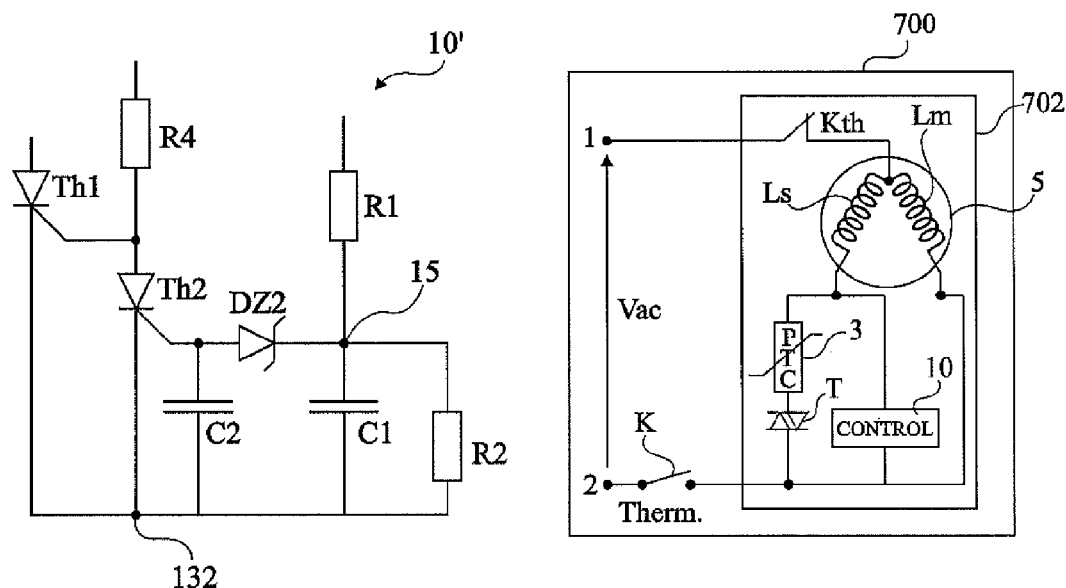
Fig 4
Fig 7

CONTROL OF A TRIAC FOR THE STARTING OF A MOTOR

CROSS REFERENCE TO RELATED APPLICATIONS

This is a continuation-in-part of prior application Ser. No. 11/602,889, filed Nov. 21, 2006, entitled "Control Of A Triac For The Starting Of A Motor", now allowed, which claims priority to French application serial number 05/53570, filed Nov. 23, 2005, entitled "Control Of A Triac For The Starting Of A Motor," which are herein incorporated by reference in their entirety.

BACKGROUND OF THE INVENTION

1. Field of the Invention

The present invention generally relates to circuits for starting asynchronous motors powered by an A.C. voltage and, more specifically, to a circuit for controlling a triac driving an auxiliary winding of an asynchronous motor for starting thereof.

An example of application of the present invention relates to compressors which generally comprise such asynchronous motors powered by the A.C. mains voltage.

2. Discussion of the Related Art

FIG. 1 very schematically shows a conventional example of a circuit for controlling windings of an asynchronous motor. For simplification, the motor has been symbolized by a main winding Lm and an auxiliary winding Ls used for the starting. Main winding Lm is intended to be powered by an A.C. voltage Vac applied between two terminals 1 and 2. A switch K (for example, controlled by a thermostat Th, by the user, etc.) is interposed in series with winding Lm between terminals 1 and 2.

To start an asynchronous motor, it is necessary to create torque by means of a phase shift or by injecting a current greater than the current absorbed by winding Lm. Such is the function of auxiliary winding Ls, connected in parallel with the main winding.

This auxiliary or starting winding Ls is not intended to operate continuously. This is why it is generally associated with a resistive element 3 of positive temperature coefficient (PTC) having its resistance increasing along with temperature. Element 3 enables disconnecting the auxiliary winding once the motor has started, the current then flowing in the auxiliary winding being sufficient for the resistance of element 3 to be considered as opening the branch of the auxiliary winding.

To avoid that element 3 continuously dissipates power in the circuit it is generally series-connected with a triac T. Thus, as illustrated in FIG. 1, auxiliary winding Ls in series with element 3 and triac T are connected in parallel with main winding Lm. The gate of triac T is connected to the junction point of a resistor R and a capacitor C, connected between terminals 1 and 2, a rectifying diode D being interposed between terminal 1 and resistor R with its anode on the side of terminal 1.

The circuit of FIG. 1 is described in document EP-A-0571956.

When a voltage Vac is applied between terminals 1 and 2 and switch K is turned on, the current which flows in winding Ls helps provide a torque to the motor to start it. In parallel, triac T is turned on by the gate current provided thereto by diode D and resistor R. A circuit 6 is used to discharge capacitor C to turn off triac T after a given time, which disconnects winding Ls. This time set by circuit 6 corresponds to the starting time. The starting time (conduction of winding Ls) is set by the time constant brought by resistor R and capacitor C. In such a circuit, resistive element 3 of positive temperature coefficient is used as a security for the case where triac T would be defective.

A disadvantage of the circuit of FIG. 1 is that it is used only once, on powering-on of the assembly. Due to the direct connection of diode D to terminal 1, it is no longer used when the thermostat turns off the motor, capacitor C remaining charged.

Even if the starting circuit (diode D, resistor R, capacitor C) were connected downstream of switch K (anode of diode D connected between switch K and windings Lm and Ls), the absence of the discharge circuit of capacitor C would adversely affect the restarting of the motor, after a turning-off/turning-on of the thermostat.

Further, most often, a normally-on switch (not shown in FIG. 1) used as a thermal protection (known under name KLIXON) is interposed between point 4 of interconnection of windings Ls and Lm and switch K. This protection switch is generally internal to the motor so that point 4 is, in practice, not accessible. In such a case, the circuit of FIG. 1 does not enable automatically restarting the motor on turning-on of switch KLIXON, after having undergone a thermal protection opening.

Assemblies (for example, from document U.S. Pat. No. 5,989,289) are also known in which a second resistive element with a positive temperature coefficient is provided to supply the triac gate. A disadvantage of this assembly is that the priming is late in the case where the second resistive element heats up, which generates electromagnetic noise. Another disadvantage of this type of assembly is a halfwave conduction.

SUMMARY OF THE INVENTION

At least one embodiment of the present invention aims at overcoming all or part of the disadvantages of known circuits for controlling a triac used to disconnect an auxiliary winding of a motor once it has been started.

At least one embodiment of the present invention more specifically aims at providing a re-triggerable solution, that is, enabling successive startings of the motor without generating an excessive heat dissipation in a resistive element.

At least one embodiment of the present invention also aims at providing an integrable solution.

At least one embodiment of the present invention also aims at providing a solution compatible with the operation of a thermal protection making one of the terminals of the motor winding not directly accessible.

To achieve all or part of these as well as other objects, at least one embodiment of the present invention provides a circuit for controlling a triac intended to be series-connected with a resistive element with a positive temperature coefficient or a capacitive element, and a winding for starting an asynchronous motor for supply by an A.C. voltage, comprising:

a circuit for detecting a voltage representative of the voltage across the series connection of said element and of the triac, and for comparing this voltage with respect to a threshold; and a circuit for blocking a turning back on of the triac when said threshold has been exceeded.

According to an embodiment of the present invention, said element is a resistor with a positive temperature coefficient.

According to an embodiment of the present invention, the circuit further comprises a circuit for controlling the triac at the voltage zero, controlled by said blocking circuit.

According to an embodiment of the present invention, said blocking circuit stores the information that said threshold has been exceeded.

According to an embodiment of the present invention, said detection and comparison circuit comprises:

a resistive dividing bridge receiving said voltage representative of the halfwave-rectified voltage across the series connection of the triac and of said element; and a zener diode having its threshold voltage setting the triggering of the blocking circuit.

According to an embodiment of the present invention, the blocking circuit comprises a switch selected from among a MOS transistor, a cathode-gate thyristor, a bipolar transistor, to ground the gate of the triac.

According to an embodiment of the present invention, said blocking circuit is sized to store the blocking for at least two halfwaves of the supply voltage.

According to an embodiment of the present invention, the circuit for detecting the voltage comprises a capacitive divider for dividing the voltage across the series connection of said element and the triac.

According to an embodiment of the present invention, the circuit for comparing the voltage with a threshold comprises a pair of zener diodes arranged to provide a two-way voltage reference, the zener diodes for example having their anodes or cathodes coupled together and are coupled via their other terminals between a node receiving the detected voltage and an input node of the blocking circuit, or the anode of one and the cathode of the other of the pair of zener diodes being coupled to a node receiving the detected voltage.

According to an embodiment of the present invention, the blocking circuit comprises at least one input node coupled to the control terminal of a first transistor and to the control terminal of a second transistor, the first and second transistors each having main current terminals coupled between a control node of the triac and a reference voltage level.

According to an embodiment of the present invention, the blocking circuit further comprises a first capacitor coupled to the control terminal of the first transistor and arranged to store the voltage detected during a positive cycle of the asynchronous motor, and a second capacitor coupled to the control terminal of the second transistor and arranged to store the voltage detected during a negative cycle of the asynchronous motor.

At least one embodiment of the present invention also provides, a compressor comprising an asynchronous motor comprising a winding coupled in series with a triac and a resistive element of positive temperature coefficient or a capacitive element, and the above circuit arranged to control the triac.

At least one embodiment of the present invention also provides a circuit for controlling an asynchronous motor provided with a main winding and with an auxiliary starting winding, comprising at least one supply switch in series with said windings, and a triac in series with a resistive element of positive temperature coefficient, or a capacitive element, and the auxiliary winding, the motor control circuit comprising a circuit for controlling the triac.

At least one embodiment of the present invention also provides a method for controlling a triac intended to be series-connected with a resistive element of positive temperature coefficient or a capacitive element, and a winding for starting an asynchronous motor, for supply by an A.C. voltage, comprising the steps of:

detecting a voltage representative of the voltage across the series connection of said element and of the triac;

comparing this detected voltage with a threshold; and blocking a turning back on of the triac when said threshold has been exceeded.

According to an embodiment of the present invention, the information that said threshold has been exceeded is stored for at least two halfwaves of the supply voltage to maintain the triac blocking.

The foregoing and other objects, features, and advantages of the present invention will be discussed in detail in the following non-limiting description of specific embodiments in connection with the accompanying drawings.

BRIEF DESCRIPTION OF THE DRAWINGS

FIG. 3 is a detailed electric diagram of an example embodiment of the control circuit of FIG. 2;

FIG. 4 shows a variation of the circuit of FIG. 3;

FIG. 7 shows a compressor according to an embodiment of the present invention.

DETAILED DESCRIPTION

Figure 1:
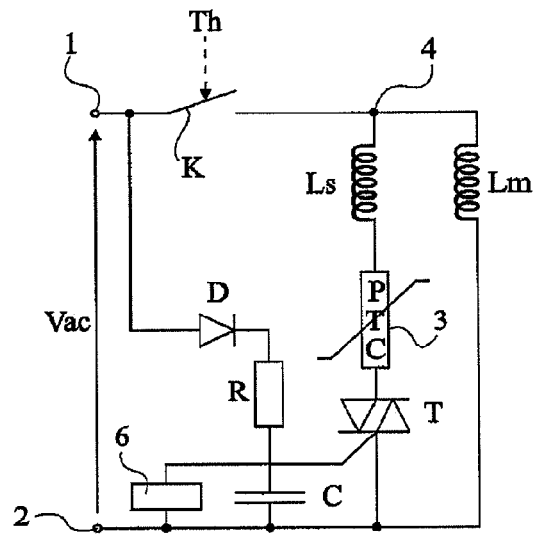
FIG. 1, previously described, shows a conventional example of a circuit for controlling a triac used to start an asynchronous motor of the type to which the present invention applies.

The same elements have been referred to with the same reference numerals in the different drawings. For clarity, only those elements that are necessary to the understanding of the present invention have been shown in the drawings and will be described hereafter. In particular, the details constitutive of an asynchronous motor have not been described in detail, the present invention being compatible with any conventional asynchronous motor comprising an auxiliary winding used for its starting.

Figure 2:
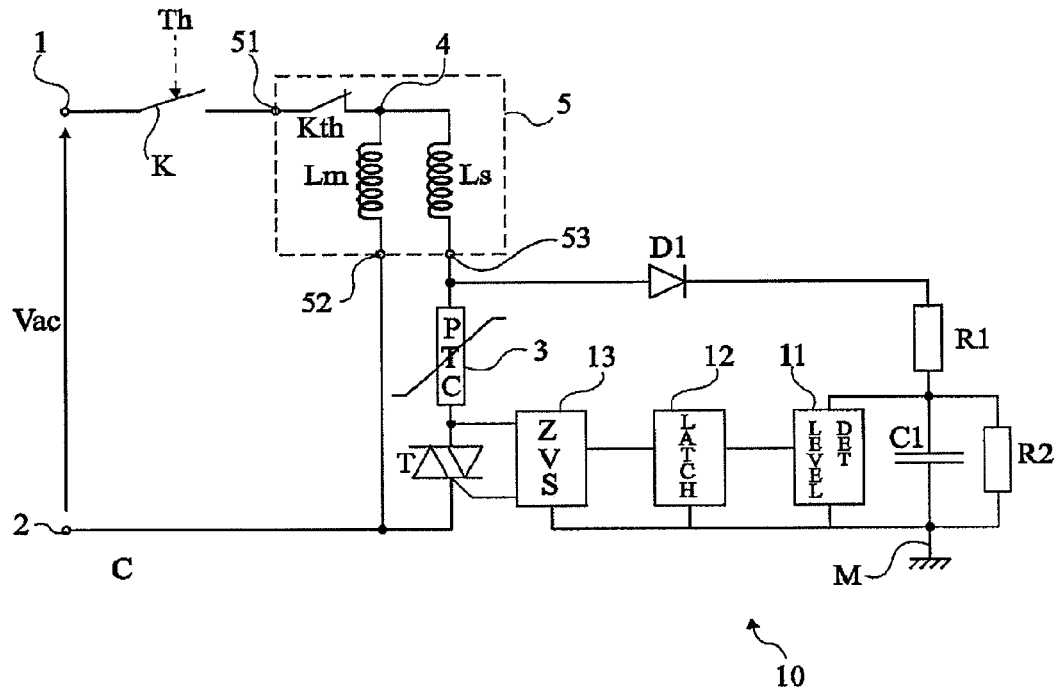
FIG. 2 very schematically shows in the form of blocks an embodiment of a circuit for controlling a triac in an asynchronous motor start circuit according to the present invention.

FIG. 2 very schematically shows in the form of blocks an embodiment of a circuit 10 for controlling a triac T used to start an asynchronous motor 5. In FIG. 2, motor 5 is symbolized by its main winding Lm, its secondary winding Ls, and a thermal protection switch Kth (KLIXON). Switch Kth connects a common node 4 of windings Lm and Ls to a terminal 51 intended to be connected, via a switch K (for example, controlled by a thermostat Th), to a terminal 1 of application of an A.C. supply voltage Vac between terminals 1 and 2. The other ends of windings Lm and Ls define terminals 52 and 53 accessible from the outside of motor 5. Terminal 52 is intended to be directly connected to the other terminal 2 of application of voltage Vac. As previously, terminal 53 is connected to terminal 2 by means of a resistive element 3 with a positive temperature coefficient (PTC) in series with triac T.

According to this embodiment of the present invention, a measure (block 11, LEVEL DET) of a voltage V53 present between terminal 53 and the ground is used, this voltage being representative of voltage V3 across resistive element 3 and triac T in series, to be compared with a threshold. This measurement is performed, for example, by means of a resistive dividing bridge formed of two resistors R1 and R2 in series between terminal 53 and ground M, with an interposed rectifying diode D1 having its anode connected to terminal 53. A first capacitor C1 is optionally used to filter possible disturbances.

When voltage V53 reaches a determined threshold, the corresponding information is latched (block 12, LATCH) or stored. Such a function is made necessary by the fact that the signal is variable with the periodicity of the supply voltage (generally, the mains).

Preferably, triac T is made conductive on each zero crossing of voltage V53 by means of a block 13 (ZVS) to limit electromagnetic disturbances by the turning-on of triac T. When voltage V53 reaches the determined threshold, circuit 12 deactivates circuit 13 and thus prevents triac T becoming conductive on each zero crossing.

An advantage which already appears from the functional representation of FIG. 2 is that the circuit of the present invention automatically reactivates in case of a disappearing of supply voltage Vac across windings Lm and Ls, be it via control thermostat Th or by thermal security Kth integrated to the motor.

FIG. 3 shows the detailed electric diagram of a first example of embodiment of circuit 10 of FIG. 2. According to this example, control circuit 13 of triac T at the voltage zero comprises a cathode-gate thyristor Th1 having its anode connected, via a resistor R3, to a positive output terminal 131 of a fullwave rectifying bridge formed of diodes D3, D4, D5, and D6, the cathode of thyristor Th1 being connected to a second rectified output terminal 132 of the bridge. A first A.C. input terminal 133 of the bridge (anode of diode D3 and cathode of diode D5) is connected to junction point 14 of resistive element 3 and triac T. Second A.C. input terminal 134 of the bridge is connected to the gate of triac T. The gate of thyristor Th1 is connected to the junction point of a resistor R4 and of a MOS transistor M connected between terminal 53 and ground M (corresponding to the second rectified output terminal 132 of the bridge).

Assuming transistor M to be turned off (non-conducting), as soon as voltage V53 starts increasing at the beginning of the halfwave while resistive element 3 is cold, a current flows both through this element 3 and through resistor R4 (via the rectifying bridge) to trigger thyristor Th1. Once said thyristor has been triggered, the current flowing through element 3 and through resistor R3 is used to trigger thyristor triac T via two of the diodes of the rectifying bridge, of resistor R3, and of thyristor Th1. Thyristor Th1 is selected to be sensitive with respect to triac T and resistor R4 is selected to be greater than resistor R3 to reduce losses in the blocked state of triac T.

When resistive element 3 is hot, assuming that triac control circuit 10 does not turn off said triac once the motor has started, auxiliary winding Ls is disconnected due to the high resistance of element 3. The security brought by element 3 is thus preserved.

Level detection circuit 11 comprises the resistive dividing bridge formed of resistors R1 and R2, capacitor C1, and a zener diode DZ1 having its threshold value selected according to the desired triggering threshold.

Junction point 15 of resistors R1 and R2 is connected to the emitter of a first PNP-type bipolar transistor B1 having its collector connected to the base of a second NPN-type bipolar transistor B2, the base of transistor B1 being connected to the collector of transistor B2 and also, via a resistor R5, to point 15. Transistors B1 and B2 and resistor R5 form an anode-gate thyristor of the detection circuit. The anode of diode DZ1 is grounded while its cathode is connected to the base of transistor B1. As soon as the voltage between terminal 15 and ground M exceeds the threshold voltage of diode DZ1 (neglecting the voltage drop in resistor R5), transistor B1 turns on, which turns on transistor B2 which provides a locking of the conduction of transistor B1. Diode D1 provides a halfwave rectification for the voltage measured by bridge R1/R2.

Transistors B1 and B2 block as soon as the current in diode D7 disappears, when the voltage across capacitor C1 becomes lower than that across capacitor C2. Locking circuit 12 is required to store the detection performed by circuit 11 to turn on transistor M and prevent the restarting of circuit 13 by short-circuiting the gate and the cathode of thyristor Th1.

The locking circuit comprises a capacitor C2 grounding the gate of transistor M in parallel with a resistor R7 of high value. The emitter of transistor B2 is connected to the gate of transistor M by a diode D7, the anode of diode D7 being on the emitter side of transistor B2. Capacitor C2 is used to store the information detected by circuit 11 to turn on transistor M. The time constant of the resistive and capacitive cell C2-R7 is selected according to the period of the A.C. supply voltage (and thus to voltage V53) to store the information for at least one period. For example, for a 50-Hz A.C. voltage, a time constant in the order of 20 milliseconds will be selected. Resistor R7 is used to discharge capacitor C2 to enable resetting of the circuit when voltage V53 disappears for a sufficiently long time indicating a need to restart the motor.

Optional capacitor C1 of circuit 11 enables accelerating the charging of capacitor C2 at each halfwave and is used to filter possible disturbances present on voltage V53.

As a specific example embodiment, an assembly such as shown in FIG. 3 is formed with components having the following values: R1=510 kiloohms, R2=30 kiloohms, R3=620 ohms, R4=R7=1 megaohm, R5=10 kiloohms, C1=C2=10 nanofarads, DZ1=15 volts, Vac=220 or 230 volts—50 Hz.

As a variation, transistor M is a bipolar transistor and the circuit is adapted for a current triggering.

FIG. 4 shows an alternative embodiment of starting circuit 10' in which thyristor Th1 is no longer blocked by means of a transistor M but by means of a cathode-gate thyristor Th2 connecting the gate of thyristor Th1 to ground (terminal 132). A zener diode DZ2 connects the gate of thyristor Th2 to node 15 (anode of diode DZ2 on the side of thyristor Th2). As soon as the voltage at node 15 becomes greater than the threshold voltage of zener diode DZ2, a current flows through the gate of thyristor Th2 to trigger it. Preferably, a capacitor C2 between the gate of thyristor Th2 and the ground stores sufficient power to maintain thyristor Th2 on for two halfwaves while current is only injected one halfwave out of two by the halfwave rectification performed due to diode D1 (not shown in FIG. 4).

Figure 5:
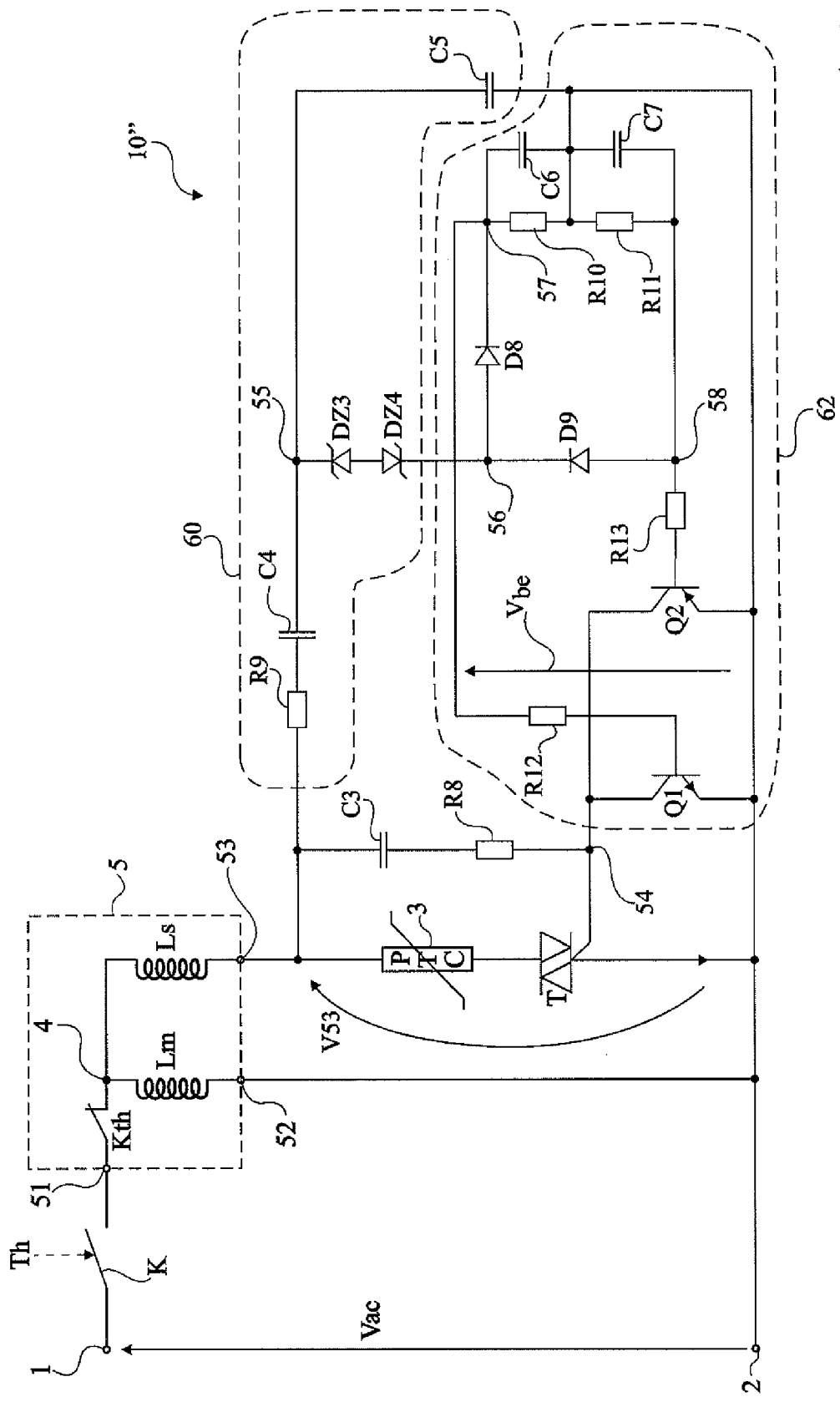
FIG. 5 is an electric diagram showing a circuit for controlling a triac in an asynchronous motor start circuit according to a further embodiment of the present invention.

FIG. 5 illustrates, in circuit diagram form, an alternative embodiment of a circuit 10" for controlling a triac T used to start an asynchronous motor 5.

Many elements of the circuit of FIG. 5 are the same as those of FIG. 2. These elements have been labeled with like reference numerals and will not be described again in detail. In particular, the main winding Lm, secondary winding Ls and thermal protection switch Kth of the motor 5, as well as the further switch K are the same as those of FIG. 2. As with the circuit of FIG. 2, terminal 53 of the asynchronous motor 5 is coupled to terminal 2 by means of a resistive element 3 having a positive temperature coefficient (PTC) coupled in series with a triac T. Furthermore, as with the circuit of FIG. 2, an A.C. supply voltage Vac is applied between terminals 1 and 2.

In circuit 10", a capacitor C3 and a resistor R8 are coupled in series with each other between node 53 and a node 54, node 54 providing a control signal to triac T. Node 53 is also coupled to a node 55 via a resistor R9 coupled in series with a capacitor C4. Node 55 is further coupled to terminal 2 via a capacitor C5. Capacitors C4 and C5 form a capacitive divider, providing at node 55 a voltage part-way between the voltages at node 53 and terminal 2. Node 55 is coupled to a node 56 via a pair of zener diodes DZ3 and DZ4 coupled anode to anode to provide a two-way voltage reference. Alternatively, zener diodes DZ3 and DZ4 could be coupled cathode to cathode to provide the two-way voltage reference. Node 56 is further coupled to a node 57 via a diode D8, and to a node 58 via a diode D9, diodes D8 and D9 having their anodes coupled to nodes 56 and 58 respectively. Node 57 is coupled to terminal 2 by a resistor R10 and a capacitor C6 coupled in parallel with each other, and node 58 is coupled to terminal 2 via a resistor Rh1 and a capacitor C7 coupled in parallel with each other. Node 57 is also coupled to the control node of a transistor Q1 via resistor R12, while node 58 is coupled to the control node of a transistor Q2 via a resistor R13. Each transistor Q1, Q2 is coupled via its main current terminals between node 54 and terminal 2. In this example, transistors Q1 and Q2 are bipolar junction transistors, and Q1 is for example of NPN type, while Q2 is of PNP type.

As a specific example, an assembly such as shown in FIG. 5 is formed with components having the following values: R8=R9=100 ohms, R10=R11=100 kilo ohms, R12=R13=5.1 kilo ohms, C3=C4=150 nanofarads, C5=1 microfarad, C6=C7=10 microfarads, DZ3=DZ4=20 volts, D8=D9=30 volts, Vac=230 volts–50 Hz.

In operation, during the positive cycle, while transistors Q1 and Q2 are non-conducting, triac T is controlled to be on by the voltage at node 53 providing a current to the control node 54 via capacitor C3 and resistor R8. The circuitry delimited by the dashed line 60 comprising resistor 9, capacitors C4 and C5, and zener diodes DZ3 and DZ4, provides a level detector, which provides a positive, zero, or negative voltage at node 56 based on the voltage at node 55. In particular, when the resistance of the PTC resistive element 3 increases to over a certain value, the voltage V53 across the triac T and the PTC resistive element 3 will also increase, and cause the voltage at node 55 to exceed a threshold determined by the zener diodes DZ3 and DZ4. The zener diodes DZ3 and DZ4 will thus conduct, and increase the voltage at node 56. The circuitry delimited by dashed line 62 comprising diodes D8 and D9, resistors R10 to R13, capacitors C6 and C7 and transistors Q1 and Q2 forms a blocking circuit that blocks the triac based on the level detected by the level detector 60. This output of the level detector at node 56 is applied to the gate node of transistor Q1 via diode D8 and resistor R12, such that transistor Q1 becomes conducting, coupling node 54 to terminal 2. This counteracts the effect of the capacitor C3 and resistor R8, and the results in the current from node 54 to terminal 2 falling, thereby turning off triac T.

During the negative cycle, the circuit will operate in a similar fashion, except that the voltage at node 56 will be negative by conduction of capacitor C7 and diodes DZ3, DZ4 and D9, and transistor Q2 rather than transistor Q1 will be turned on via the resistor R13 and diode D9 when the resistance of the PTC resistive element 3 exceeds a certain level.

The purpose of capacitors C6 and C7 is to introduce a time constant into the control of the triac. In particular, when the Zener diodes DZ3 and DZ4 pass a voltage to node 56, it will be stored at nodes 57 and 58 by the capacitors C6 and C7, but will slowly discharge via resistors R10 and R11.

With respect to the embodiments of FIGS. 2 and 3, the embodiment of FIG. 5 allows the zero voltage crossing (ZVS) block 13, and thus the rectifying diode bridge formed by diodes D3 to D6, to be removed.

Figure 6:
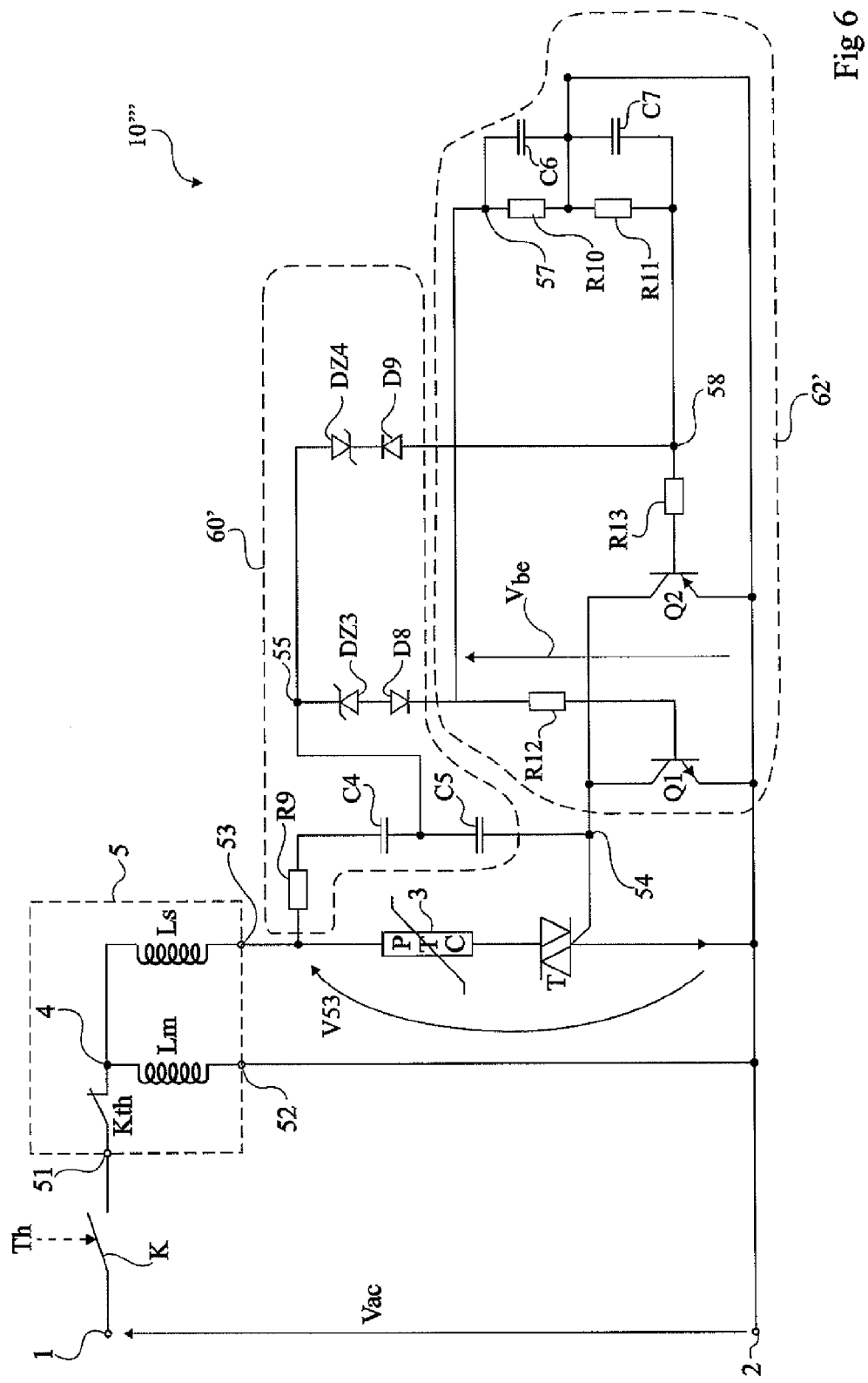
FIG. 6 is an electric diagram showing a circuit for controlling a triac in an asynchronous motor start circuit according to yet a further embodiment of the present invention.

FIG. 6 illustrates in circuit diagram form a further embodiment of a circuit 10''' for controlling a triac T used to start an asynchronous motor 5.

Many features of the circuit 10''' are the same as those of circuit 10'' of FIG. 5. These features have been labeled with like reference numerals, and will not be described again in detail.

In the embodiment of FIG. 6, node 53 of the asynchronous motor 5 is coupled to the control node of triac T via resistor R9, capacitor C4 and capacitor C5 coupled in series. Node 55 is at a point between capacitors C4 and C5, and in this embodiment is coupled to the cathode of zener diode DZ3 and to the anode of zener diode DZ4. Zener diode DZ3 is coupled anode to anode with diode D8, and the cathode of diode D8 is coupled to node 57, while zener diode DZ4 is coupled cathode to cathode with a diode D9, and the anode of diode D9 is coupled to node 58. As with the arrangement of FIG. 5, zener diodes DZ3 and DZ4 provide a two-way voltage reference. In alternative embodiments diodes DZ3 and D8 could be coupled cathode to cathode and/or diodes DZ4 and D9 could be coupled anode to anode.

As with the embodiment of FIG. 5, node 57 is coupled to the gate node of transistor Q1 via resistor R12 and node 58 is coupled to the gate node of transistor Q2 via resistor R13. Node 57 is also coupled to terminal 2 via resistor R10 and capacitor C6 in parallel, and node 58 is coupled to terminal 2 via resistor R11 and capacitor C7 in parallel.

The circuit 10''' of FIG. 6 operates in much the same way as circuit 10'' of FIG. 5. The circuitry delimited by dashed line 60' in FIG. 6 comprising the diodes DZ3, DZ4, D8 and D9, the capacitors C4 and C5, and the resistor R9, forms the level detector that detects a level of the voltage across the PTC resistive element 3 and triac T. The circuitry delimited by dashed line 62' comprising resistors R10 to R13, capacitors C6 and C7, and transistors Q1 and Q2, forms a blocking circuit that blocks the triac T when the level detected at node 53 increases above a certain level during the positive cycle, or below a certain level during the negative cycle.

For the turning on of the triac, capacitors C4 and C5 play the equivalent role of capacitor C3 of FIG. 5, and for the voltage detection, capacitors C4 and C5 provide a capacitor divider equivalent to capacitors C4 and C5 of FIG. 5.

As a specific example, an assembly such as shown in FIG. 6 is formed with components having the following values: R9=150 ohms, R10=R11=100 kilo ohms, R12=R13=5 kilo ohms, C4=150 nanofarads, C5=1.5 microfarads, C6=C7=20 microfarads, DZ3=DZ4=20 volts, D8=D9=40 volts, Vac=230 volts–50 Hz.

FIG. 7 illustrates an apparatus 700 comprising a compressor 702 comprising the asynchronous motor 5 coupled to the PTC resistive element 3 and triac T in series, and the control circuit 10, which could be any of the circuits 10, 10', 10'' or 10''' described herein. In this example, thermal switch K is coupled to terminal 2 rather than terminal 1. Apparatus 700 is for example a fridge, air conditioning unit, dehumidifier, or other apparatus comprising a compressor.

An advantage of at least one embodiment of the present invention is that the control circuit preserves a setting to the on state of triac T to the voltage zero.

Another advantage of at least one embodiment of the present invention is that the circuit automatically reactivates in case of disappearance of the supply voltage.

Another advantage of at least one embodiment of the present invention is that is preserves the security brought by resistive element 3 of positive temperature coefficient in case of a failure of the triac.

Another advantage of at least one embodiment of the present invention is that it preserves the operation of the thermal motor protection.

Of course, the present invention is likely to have various alterations, modifications, and improvements which will readily occur to those skilled in the art. In particular, the sizing of the different circuit components is to be adapted to the application and especially to the motor and supply voltage features.

Further, although the present invention has been described in relation with a positive temperature coefficient resistor, it also applies to the starting circuit in which this element is replaced with a capacitive element or a resistive and capacitive element.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A circuit for controlling a triac when the triac is series-connected with a resistive element of positive temperature coefficient or a capacitive element, and a winding for starting an asynchronous motor for supply by an A.C. voltage, comprising:
   a circuit for detecting a voltage representative of the voltage across a combination of said element and of the triac, and for comparing this voltage with respect to a threshold; and
   a circuit for blocking a turning back on of the triac when said threshold has been exceeded.

2. The circuit of claim 1, wherein said element is a resistor with a positive temperature coefficient.

3. The circuit of claim 1, further comprising a circuit for controlling the triac at the voltage zero, controlled by said blocking circuit.

4. The circuit of claim 1, wherein said blocking circuit stores the information that said threshold has been exceeded.

5. The circuit of claim 1, wherein said detection and comparison circuit comprises:
   a resistive dividing bridge receiving said voltage representative of the halfwave-rectified voltage across the combination of the triac and of said element; and
   a zener diode having its threshold voltage setting the triggering of the blocking circuit.

6. The circuit of claim 5, wherein the blocking circuit comprises a switch selected from among a MOS transistor, a cathode-gate thyristor, a bipolar transistor, to ground the gate of the triac.

7. The circuit of claim 6, wherein said blocking circuit is sized to store the blocking for at least two halfwaves of the supply voltage.

8. The circuit of claim 1, wherein the circuit for detecting the voltage comprises a capacitive divider for dividing the voltage across the series connection of said element and the triac.

9. The circuit of claim 1, wherein the circuit for comparing the voltage with a threshold comprises a pair of zener diodes arranged to provide a two-way voltage reference.

10. The circuit of claim 9, wherein the zener diodes have their anodes or cathodes coupled together and are coupled via their other terminals between a node receiving the detected voltage and an input node of the blocking circuit.

11. The circuit of claim 9, wherein the anode of one and the cathode of the other of said pair of zener diodes is coupled to a node receiving the detected voltage.

12. The circuit of claim 1, wherein the blocking circuit comprises at least one input node coupled to the control terminal of a first transistor and to the control terminal of a second transistor, the first and second transistors each having main current terminals coupled between a control node of the triac and a reference voltage level.

13. The circuit of claim 12, wherein the blocking circuit further comprises a first capacitor coupled to the control terminal of the first transistor and arranged to store the voltage detected during a positive cycle of the asynchronous motor, and a second capacitor coupled to the control terminal of the second transistor and arranged to store the voltage detected during a negative cycle of the asynchronous motor.

14. A circuit for controlling an asynchronous motor having a main winding and an auxiliary starting winding, comprising at least one supply switch in series with said windings, and a triac in series with a resistive element of positive temperature coefficient, or a capacitive element, and the auxiliary winding, comprising a circuit for controlling the triac of claim 1.

15. A method for controlling a triac when the triac is series-connected with a resistive element of positive temperature coefficient or a capacitive element, and a winding for starting an asynchronous motor, for supply by an A.C. voltage, comprising the steps of:
   detecting a voltage representative of the voltage across a combination of said element and the triac;
   comparing this detected voltage with a threshold; and
   blocking a turning back on of the triac when said threshold has been exceeded.

16. The method of claim 15, wherein the information that said threshold has been exceeded is stored for at least two halfwaves of the supply voltage to maintain the triac blocking.

17. A circuit for controlling a switch when the switch is coupled in series with a first element and a starting winding of an asynchronous motor, the circuit comprising:
   a first circuit to detect a signal from the first element; and
   a second circuit to prevent the switch from turning on when the signal exceeds a threshold.

18. The circuit of claim 17, wherein the first element comprises a positive temperature coefficient resistor, a capacitive element or a resistive and capacitive element.

19. The circuit of claim 17, wherein the switch comprises a triac.

20. The circuit of claim 17, wherein the signal is temperature-dependent.

21. The circuit of claim 20, wherein the signal is representative of a voltage across a series combination of the first element and the switch.

22. The circuit of claim 17, wherein the first circuit comprises:
   a diode coupled to the first element; and
   a resistive voltage-dividing bridge coupled to the diode.

23. The circuit of claim 22, wherein the diode is coupled to a terminal between the first element and the switch.

24. The circuit of claim 17, wherein first circuit comprises:
   a capacitive divider for dividing a voltage across a series connection of the first element and the switch.

25. The circuit of claim 17, wherein the second circuit comprises a Zener diode that establishes the threshold.

26. The circuit of claim 25, wherein the second circuit comprises a pair of Zener diodes arranged to provide a two-way voltage reference.

27. The circuit of claim 17, wherein the second circuit comprises at least one node coupled to a control terminal of a first transistor and to a control terminal of a second transistor, the first and second transistors each having main current terminals coupled between a control node of the switch and a reference voltage level.

28. The circuit of claim 27, wherein the second circuit further comprises a first capacitor coupled to the control terminal of the first transistor and arranged to store a voltage detected during a positive cycle of the asynchronous motor, and a second capacitor coupled to the control terminal of the second transistor and arranged to store a voltage detected during a negative cycle of the asynchronous motor.

29. A method of controlling a switch coupled in a first branch including a first element and a starting winding of a motor, the method comprising:
    detecting a signal from the first branch;
    determining whether the signal exceeds a threshold; and
    preventing the switch from turning on when the signal exceeds the threshold.

30. The method of claim 29, further comprising:
    storing an indication that the threshold has been exceeded, wherein the indication is stored for at least two half-waves of a supply voltage that drives the motor.

31. The method of claim 29, further comprising:
    turning on the switch at zero crossings of the voltage across the switch.

32. The method of claim 29, wherein detecting the signal comprises detecting a temperature-dependent signal from the first branch.

33. A compressor comprising:
    an asynchronous motor comprising:
        a winding coupled in series with a triac for starting an asynchronous motor for supply by an A.C. voltage; and
        a resistive element of positive temperature coefficient or a capacitive element;
    a circuit for controlling the triac when the triac is series-connected with the resistive element of positive temperature coefficient or the capacitive element, and the winding a circuit for detecting a voltage representative of the voltage across a combination of said element and of the triac, and for comparing this voltage with respect to a threshold; and
    a circuit for blocking a turning back on of the triac when said threshold has been exceeded.

* * * * *